(12) United States Patent
Deliwala

(10) Patent No.: US 9,702,690 B2
(45) Date of Patent: Jul. 11, 2017

(54) LENS-LESS OPTICAL POSITION MEASURING SENSOR

(75) Inventor: Shrenik Deliwala, Andover, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 209 days.

(21) Appl. No.: 13/329,510

(22) Filed: Dec. 19, 2011

(65) Prior Publication Data

US 2013/0155396 A1 Jun. 20, 2013

(51) Int. Cl.
| | |
|---|---|
| G01C 21/02 | (2006.01) |
| G01B 11/14 | (2006.01) |
| G01J 1/02 | (2006.01) |
| G01J 1/04 | (2006.01) |
| G01B 11/26 | (2006.01) |
| G01J 1/16 | (2006.01) |

(52) U.S. Cl.
CPC ............. *G01B 11/14* (2013.01); *G01B 11/26* (2013.01); *G01J 1/0242* (2013.01); *G01J 1/0437* (2013.01); *G01J 1/1626* (2013.01)

(58) Field of Classification Search
CPC .................................................. G01J 1/0242
USPC ......... 250/203.1–203.6, 206.1; 356/138, 154
See application file for complete search history.

(56) References Cited

U.S. PATENT DOCUMENTS

| | | | |
|---|---|---|---|
| 4,441,810 A | 4/1984 | Momose et al. | |
| 4,688,933 A | 8/1987 | Lapeyre | |
| 4,956,546 A | 9/1990 | Nishibe et al. | |
| 4,999,483 A | * 3/1991 | Okamoto | 250/203.1 |
| 5,030,828 A | * 7/1991 | Solomon | H01L 27/14603 |
| | | | 250/332 |
| 5,187,540 A | 2/1993 | Morrison | |
| 5,196,689 A | * 3/1993 | Sugita et al. | 250/206.1 |
| 5,264,910 A | * 11/1993 | Hill | G01B 11/26 |
| | | | 356/141.2 |
| 5,305,091 A | 4/1994 | Gelbart et al. | |

(Continued)

FOREIGN PATENT DOCUMENTS

| | | |
|---|---|---|
| CN | 1989895 A | 7/2007 |
| DE | 10046785 | 4/2002 |

(Continued)

OTHER PUBLICATIONS

PCT International Search Report and Written Opinion for PCT/US2012/066969 mailed on Feb. 6, 2013.

(Continued)

*Primary Examiner* — Thanh Luu
(74) *Attorney, Agent, or Firm* — Patent Capital Group

(57) ABSTRACT

An optical detector may include an aperture, at least two photodetectors, and a measuring arrangement to quantify light detected at the photodetectors after passing through the aperture without the need for a lens. The aperture may be positioned between a light source and the two photodetectors to allow light from a light source to pass through the aperture to the photodetectors. The photodetectors may include PIN junction photodiodes and may be electrically isolated from each other, positioned next to each other in a side-by-side configuration, and then aligned with the aperture so that a proportion of the quantified light detected at the photodetectors changes as an angle of light from the light source incident to the aperture changes. Optical detectors and methods are provided.

23 Claims, 14 Drawing Sheets

(56) References Cited

U.S. PATENT DOCUMENTS

| | | | |
|---|---|---|---|
| 5,361,117 A | 11/1994 | Nonaka | |
| 5,367,373 A | 11/1994 | Busch-Vishniac et al. | |
| 5,422,693 A | 6/1995 | Vogeley et al. | |
| 5,483,060 A * | 1/1996 | Sugiura et al. | 250/237 R |
| 5,527,822 A | 6/1996 | Scheiner | |
| 5,574,479 A | 11/1996 | Odell | |
| 5,598,187 A | 1/1997 | Ide et al. | |
| 5,602,384 A * | 2/1997 | Nunogaki | B60H 1/0075 126/573 |
| 5,604,695 A * | 2/1997 | Cantin et al. | 356/121 |
| 5,627,565 A | 5/1997 | Morishita et al. | |
| 5,644,126 A | 7/1997 | Ogawa | |
| 5,644,385 A | 7/1997 | Mizuno | |
| 5,719,670 A * | 2/1998 | Duboz | G01S 3/784 250/206.1 |
| 5,793,353 A | 8/1998 | Wu | |
| 5,796,387 A | 8/1998 | Curran et al. | |
| 5,825,481 A | 10/1998 | Alofs et al. | |
| 5,892,501 A | 4/1999 | Kim et al. | |
| 5,900,863 A | 5/1999 | Numazaki | |
| 5,909,296 A | 6/1999 | Tsacoyeanes | |
| 5,974,365 A | 10/1999 | Mitchell | |
| 6,014,129 A | 1/2000 | Umeda et al. | |
| 6,026,313 A | 2/2000 | Kexin | |
| 6,130,663 A | 10/2000 | Null | |
| 6,181,877 B1 | 1/2001 | Yoshida | |
| 6,274,862 B1 * | 8/2001 | Rieger | 250/216 |
| 6,280,327 B1 | 8/2001 | Leifer et al. | |
| 6,330,064 B1 | 12/2001 | Rieder | |
| 6,343,171 B1 | 1/2002 | Yoshimura et al. | |
| 6,473,189 B1 | 10/2002 | Reedy | |
| 6,495,833 B1 | 12/2002 | Alfano et al. | |
| 6,498,860 B1 | 12/2002 | Sasaki et al. | |
| 6,521,882 B1 * | 2/2003 | Sumiya et al. | 250/208.2 |
| 6,529,281 B2 | 3/2003 | Takeshita et al. | |
| 6,567,071 B1 | 5/2003 | Curran et al. | |
| 6,597,443 B2 | 7/2003 | Boman | |
| 6,997,879 B1 | 2/2006 | Turcott | |
| 7,012,691 B2 | 3/2006 | Sugiyama et al. | |
| 7,158,659 B2 | 1/2007 | Baharav et al. | |
| 7,352,477 B2 | 4/2008 | Seo | |
| 7,461,543 B2 | 12/2008 | Degertekin | |
| 7,473,884 B2 | 1/2009 | Fouquet et al. | |
| 7,505,033 B2 | 3/2009 | Guo et al. | |
| 7,655,937 B2 | 2/2010 | Hotelling et al. | |
| 7,737,409 B2 | 6/2010 | Deliwala et al. | |
| 7,787,122 B2 | 8/2010 | Saito et al. | |
| 7,852,317 B2 | 12/2010 | Grunnet-Jepsen et al. | |
| 7,931,535 B2 | 4/2011 | Ikeda et al. | |
| 7,944,551 B2 | 5/2011 | Addison et al. | |
| 7,978,311 B2 | 7/2011 | Deliwala | |
| 8,022,928 B2 * | 9/2011 | Ye | 345/158 |
| 8,133,769 B1 * | 3/2012 | Tivarus | 438/143 |
| 8,310,656 B2 | 11/2012 | Zalewski | |
| 2001/0043337 A1 | 11/2001 | Takeshita et al. | |
| 2002/0053635 A1 * | 5/2002 | Schroter et al. | 250/203.1 |
| 2003/0090650 A1 | 5/2003 | Fujieda | |
| 2003/0197114 A1 * | 10/2003 | Muesch | G01S 3/7835 250/214.1 |
| 2003/0223085 A1 | 12/2003 | Rekimoto | |
| 2004/0135825 A1 | 7/2004 | Brosnan | |
| 2004/0222969 A1 | 11/2004 | Buchenrieder | |
| 2004/0225207 A1 | 11/2004 | Bae et al. | |
| 2004/0266528 A1 | 12/2004 | Wang | |
| 2005/0259097 A1 | 11/2005 | Lehoty et al. | |
| 2007/0018970 A1 | 1/2007 | Tabasso et al. | |
| 2007/0078311 A1 | 4/2007 | Al-Ali et al. | |
| 2007/0103698 A1 | 5/2007 | Liu et al. | |
| 2007/0138377 A1 | 6/2007 | Zarem | |
| 2007/0165225 A1 | 7/2007 | Trainer | |
| 2007/0252821 A1 | 11/2007 | Hollemans et al. | |
| 2007/0265075 A1 | 11/2007 | Zalewski | |
| 2008/0009690 A1 | 1/2008 | Debreczeny et al. | |
| 2008/0013826 A1 | 1/2008 | Hillis et al. | |
| 2008/0089587 A1 | 4/2008 | Kim et al. | |
| 2008/0100825 A1 | 5/2008 | Zalewski | |
| 2008/0150898 A1 | 6/2008 | Low et al. | |
| 2008/0215974 A1 | 9/2008 | Harrison et al. | |
| 2008/0220814 A1 | 9/2008 | Hedtke et al. | |
| 2008/0221418 A1 | 9/2008 | Al-Ali et al. | |
| 2008/0278445 A1 | 11/2008 | Sweetser et al. | |
| 2009/0062667 A1 | 3/2009 | Fayram et al. | |
| 2009/0078858 A1 | 3/2009 | Fouquet et al. | |
| 2009/0085869 A1 | 4/2009 | Destura et al. | |
| 2009/0091532 A1 | 4/2009 | Hockett | |
| 2009/0092284 A1 | 4/2009 | Breed et al. | |
| 2009/0280843 A1 | 11/2009 | Wisebourt et al. | |
| 2009/0325408 A1 | 12/2009 | Wong et al. | |
| 2010/0201812 A1 | 8/2010 | McGibney et al. | |
| 2010/0231513 A1 | 9/2010 | Deliwala | |
| 2010/0271617 A1 | 10/2010 | Damink et al. | |
| 2010/0277431 A1 | 11/2010 | Klinghult | |
| 2010/0305418 A1 * | 12/2010 | Deliwala | 600/324 |
| 2010/0309457 A1 | 12/2010 | Cui et al. | |
| 2012/0280107 A1 * | 11/2012 | Skurnik et al. | 250/206.1 |

FOREIGN PATENT DOCUMENTS

| | | |
|---|---|---|
| DE | 10218160 | 4/2002 |
| DE | 69323618 | 2/2005 |
| DE | 102009046740 | 7/2011 |
| EP | 0271340 A1 | 6/1988 |
| EP | 0625692 | 5/1994 |
| EP | 0905646 A1 | 3/1999 |
| WO | 00/07148 | 2/2000 |
| WO | 2011/058190 | 5/2011 |

OTHER PUBLICATIONS

PCT International Search Report and Written Opinion issued in PCT/US2010/036438, dated Jul. 27, 2010, 9 pages.

PCT International Search Report and Written Opinion issued in PCT/US2009/041539, dated Aug. 5, 2009, 12 pages.

PCT International Search Report and Written Opinion issued in PCT/US2010/035604, dated Jul. 26, 2010, 11 pages.

Supplementary EP Search Report issued in EP Application No. 10781228, dated Jul. 31, 2014, 9 pages.

Amann, Markus-Christian, Thierry Bosch, Marc Lescrure, Risto Myllyla, Marc Rioux, "Laser ranging: a critical review of usual techniques for distance measurement", Optical Engineering, vol. 40, No. 1, Jan. 2001, pp. 10-19.

EP Communication including Supplementary European Search Report issued in EP Appln. No. 10781029.3, dated Jun. 27, 2014, 6 pages.

OA1 mailed in DE Patent Application Serial No. 112012005324.9 mailed Apr. 10, 2017, 18 pages [EN summary included].

* cited by examiner

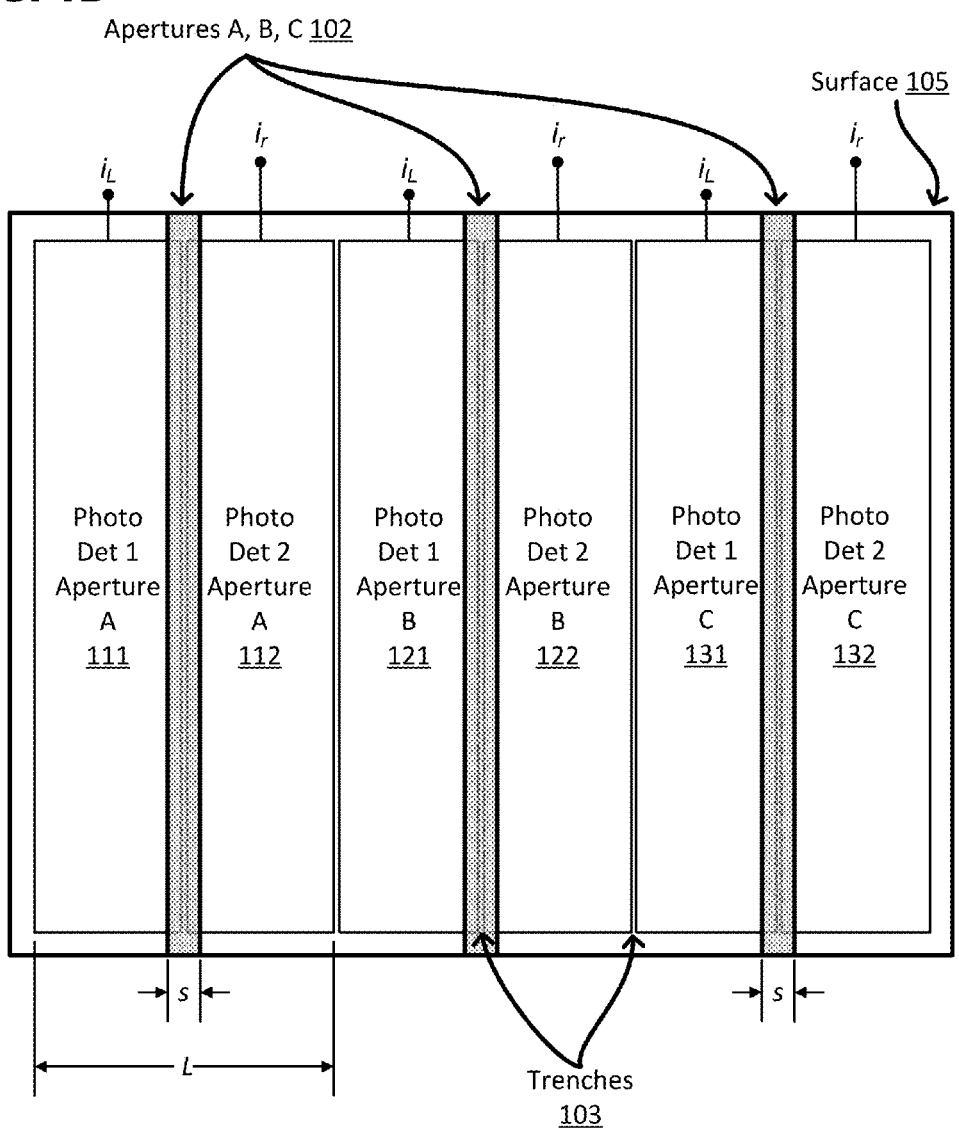

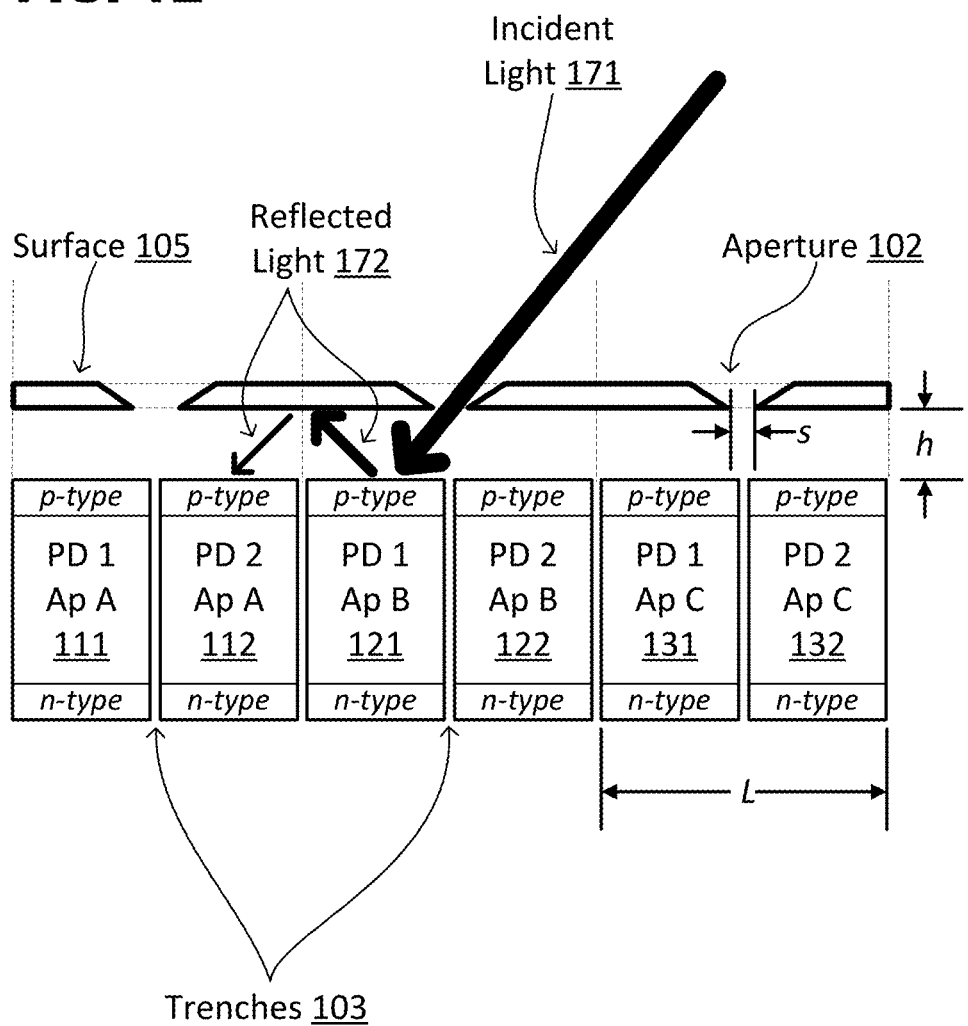

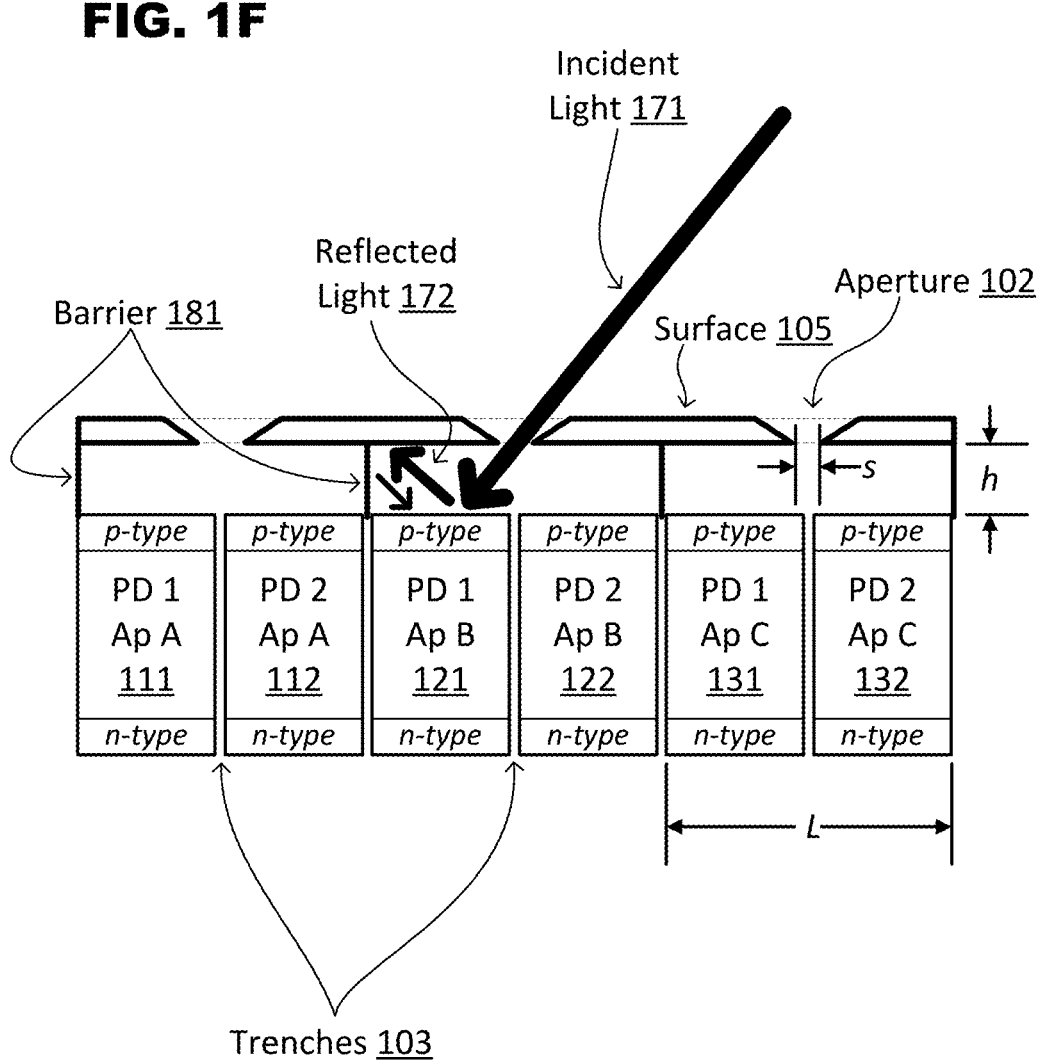

LENS-LESS OPTICAL POSITION MEASURING SENSOR

BACKGROUND

Optical sensing technology has been used to locate and track movement of objects in multiple dimensions. Traditional optical position sensitive detectors use optical lenses to focus incident light on a particular area of the detector to determine an angular location of an object emitting or reflecting the light. The lenses focus and map light rays emitting from the object to a particular location on the surface of the sensor. The angular location of the object emitting the light may be calculated from the mapped location of the light rays at the sensor and the properties of the lens. While lenses were needed to focus the light on a particular area of the detector in order to measure the properties of the light emitted from a light source, the use of lenses in these detectors has several limitations.

First, optical lenses are required to be positioned at a height at least equal to the focal length of the lens above the light detecting surface. This required separation between the lens and the light detecting surface consumes extra space in electronic devices, which makes it difficult to reduce the size of the device. Second, the lenses also represent a cost component of a detector.

Accordingly, the inventor perceives a need for a lens-less detector that is able to accurately detect and measure light to determine the position or track movement of an object emitting or reflecting light from a light source.

BRIEF DESCRIPTION OF THE DRAWINGS

FIGS. 1C and 1D show an exemplary side-view perspective and an exemplary top-view perspective, respectively, of a one-dimensional optical detector having multiple apertures and associated photodetectors in an embodiment of the invention.

FIGS. 1E, 1F, and 1G show alternative embodiments of the invention.

DETAILED DESCRIPTION

Figure 1A:
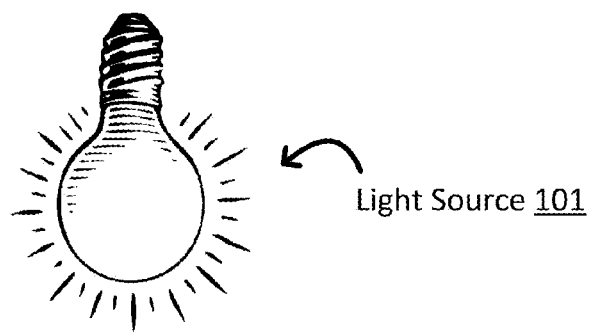
FIGS. 1A and 1B show an exemplary side-view perspective and an exemplary top-view perspective, respectively, of a one-dimensional optical detector having a single aperture and associated photodetectors in an embodiment of the invention.
Figure 1A:
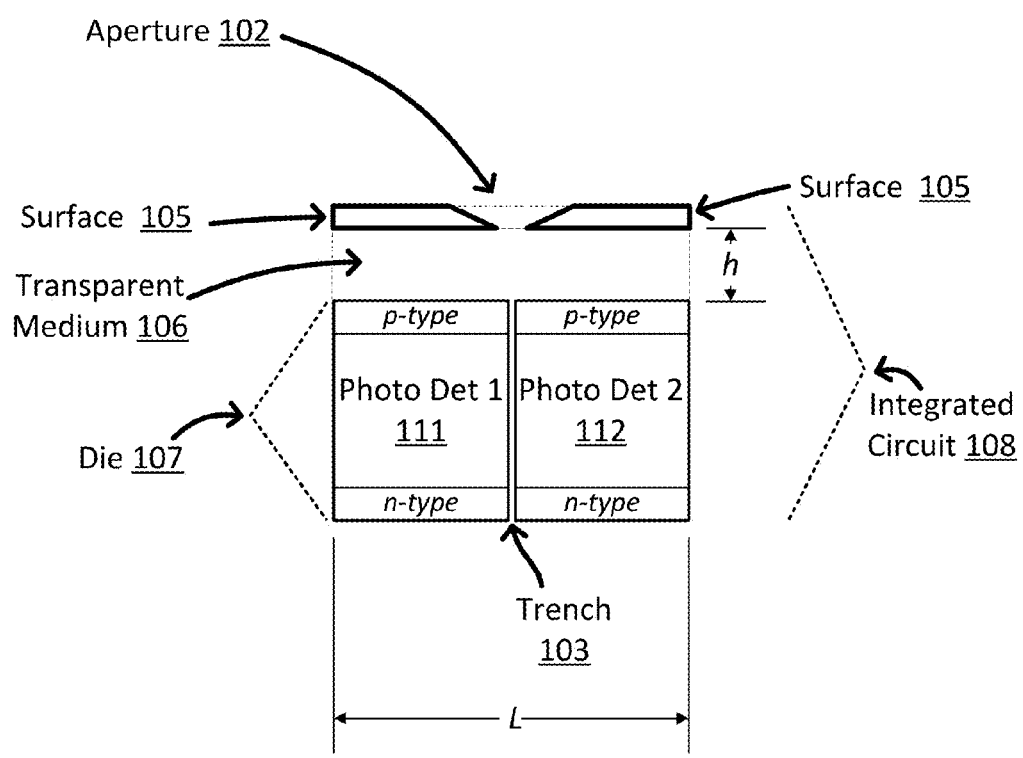

In an embodiment of the invention, an optical detector may include an integrated circuit having an aperture in a surface of the integrated circuit and at least two electrically isolated photodetectors, which may be aligned with respect to the aperture so that a quantity of the incident light from a light source detected at each of the photodetectors changes as an angle of the incident light changes with respect to the aperture. In some instances, the aperture and photodetectors may be monolithically manufactured into or on top of a single chip of silicon or other semiconductor to form the integrated circuit. In other instances, the aperture and photodetectors need not be part of an integrated circuit. In some instances, the optical detector may also include a measuring arrangement to quantify the angle of the incident light from a light source detected at the photodetectors after passing through the aperture.

The aperture may be included in a first surface of an integrated circuit forming the optical detector. The photodetectors may be embedded in the integrated circuit below the first surface. In some instances, the aperture may be monolithically constructed with the detectors to ensure precise alignment of the aperture and the photodetectors. Improving the precision of the alignment between the aperture and the photodetectors may improve the accuracy of the measured angular position of the light source. The detector has no need for an external lens.

In some instances, the surface of the integrated circuit having the aperture may be made from a metal or an opaque thin-film material. In these instances, a slit, opening, hole, or other absence of the metal or material may be provided to create the aperture. The aperture may be positioned between a light source and the photodetectors to allow light to pass through the aperture and reach the photodetectors.

The photodetectors may be electrically isolated from each other, positioned next to each other in a side-by-side configuration, and then aligned with the aperture so that a proportion of the light detected at the photodetectors changes as an angle of light incident to the aperture changes. There are many techniques for electrically isolating photodetectors positioned extremely close to each other. These techniques include using trenches, such as partial etchings and full isolation trenches, or junction isolation methods to electrically isolate the photodetectors from each other, though in other embodiments other insulators or techniques may be used.

The photodetectors may include PIN junction photodiodes having a lightly doped near intrinsic semiconductor region between the p-type and n-type semiconductor regions. The PIN junction photodiodes may be constructed so that an internal electric field due to bias as well as built-in potential forces cause essentially vertical motion of the photo-generated carriers. This may be accomplished with a high-resistivity epitaxial growth of silicon forming the PIN junction.

The measuring arrangement may include circuitry enabling the use of photocurrents to quantify the light detected at the photodetectors. Alternatively, the measuring arrangement may include circuitry enabling photodetector initiated changes to a resistance or conductivity parameter of a circuit to quantify the light detected at the photodetectors. Other techniques for quantifying the light detected at the photodetectors may also be used.

The surface of the integrated circuit may include an aperture in the shape of a slit, round hole, square hole, or other shape, such as a polygon, oval, or freeform shape.

The size and shape of the aperture and photodetectors may be selected to provide for varying shadows on each of the photodetectors as an angle of light originating from a light source incident to the aperture changes. The measuring arrangement may include circuitry to calculate this angle of light incident to the aperture from the quantified amount of light detected at the photodetectors.

In some instances where the surface of the integrated circuit containing the aperture is a metallic or other reflective medium, the edges of the aperture may be beveled to minimize reflections at an aperture edge that may erroneously cause the light to be reflected off the aperture edge and onto an incorrect light detecting surface of a photodetector. In some instances the beveled aperture edge may be directed away from the photodetector to cause the light striking the beveled edge to be reflected away from the photodetectors, though in other instances, the beveled aperture edge may be directed in an other direction.

Figure 1B:
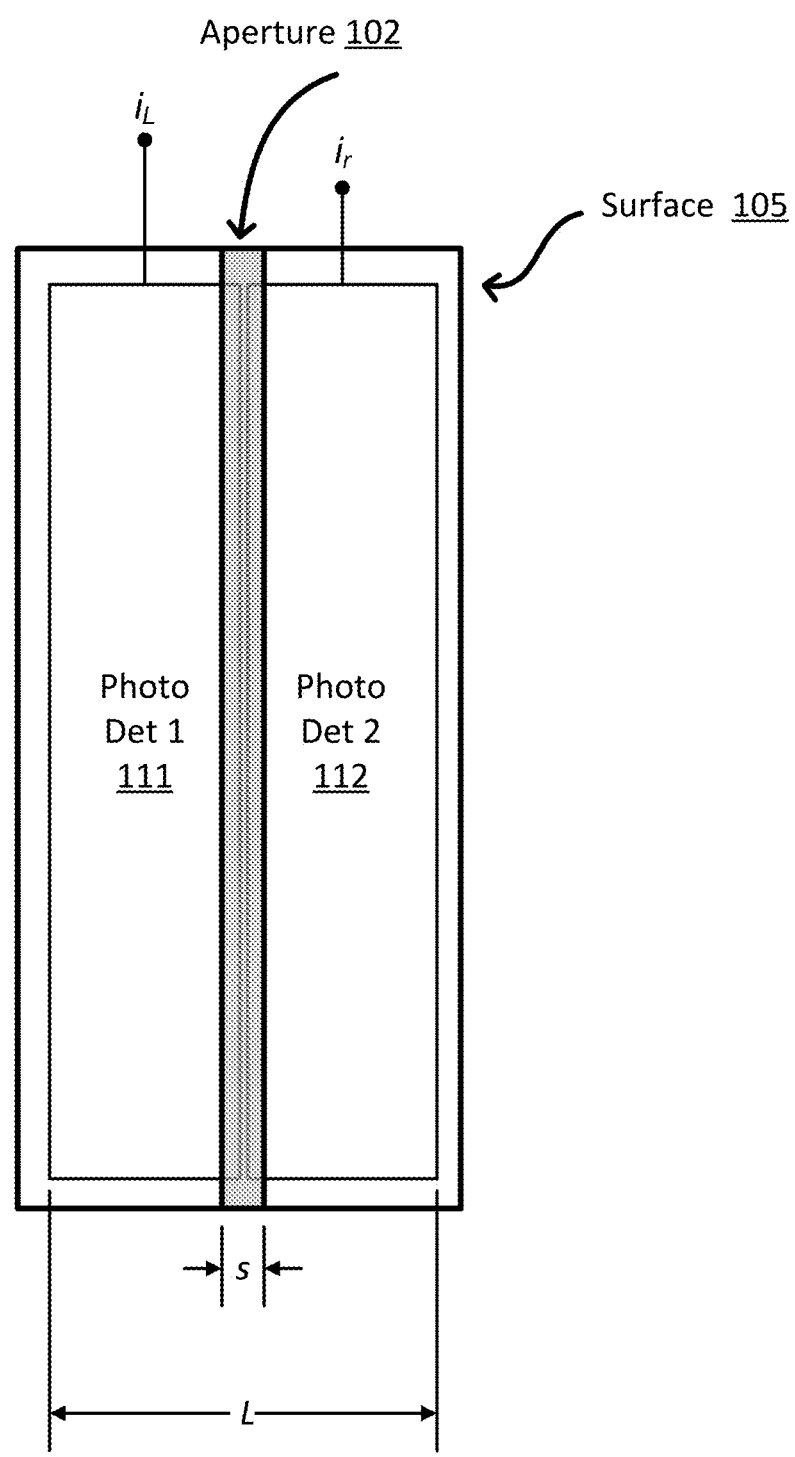
Figure 1C:
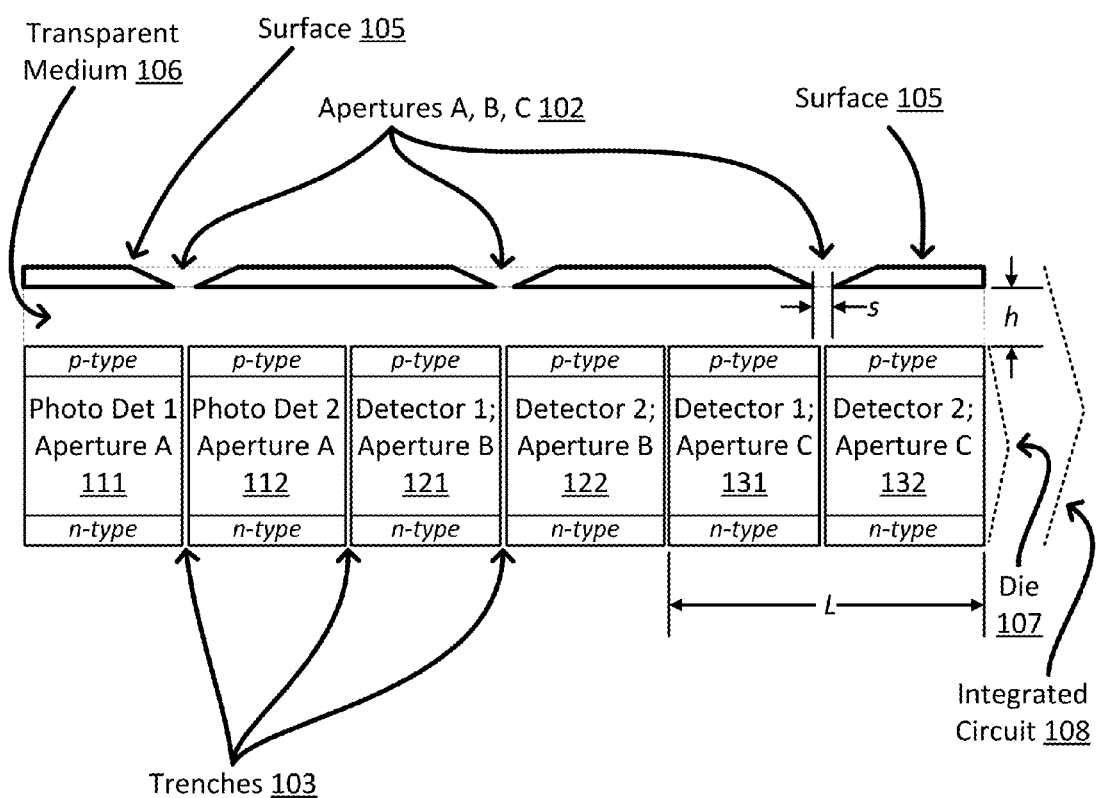

FIG. 1A shows an exemplary side-view perspective and FIG. 1B shows an exemplary top-view perspective of a one-dimensional optical detector integrated circuit 108 having a single aperture 102 and an associated pair of photodetectors 111 and 121 in an embodiment of the invention. FIG. 1C shows an exemplary side-view perspective and FIG. 1D shows an exemplary top-view perspective of a one-dimensional optical detector integrated circuit 108 having three of the single apertures 102 A, B, and C, and associated pairs of photodetectors 111 and 112, 121 and 122, and 131 and 132 as part of a single optical detector in an embodiment of the invention. In these embodiments, light from a light source 101 positioned on one side of an integrated circuit surface 105 may pass through the apertures 102 to reach the various photodetectors 111 and 112, 121 and 122, and/or 131 and 132. In different embodiments, different numbers of apertures and photodetectors may be used.

The apertures 102 may be slits having a width s, and the apertures 102 may be positioned at a height h above the photodetectors 111 to 132. In some configurations, h may be less than 30 μm and in some space saving configurations, h may be less than 10 μm or even less than 1 μm. A medium that enables light to pass through it may be placed between one or more apertures 102 and the photodetectors 111 to 132. In some instances, the medium may be glass, including forms of glass used during semiconductor device fabrication. The width s of the photodetector may depend on an angular range requirement and h.

The angle of the light source may be calculated by measuring a relative proportion of photocurrents detected at each of the photodetectors, provided that the light from the light source is able to reach at least two of the photodetectors. When all of the light from the light source falls on only one detector it may not be possible to measure changes to the angle of the light source. The maximum angle $\theta_{max}$ that may be measured may occur approximately at $\tan(\theta_{max}) \sim \pm s/h$.

If light emitted from a light source is angularly distributed so that the emitted light reaches the photodetectors from multiple angles with intensity $\text{In}(\theta)$, then the average angular position of the emitted light may be calculated. Assuming $S_L(\theta)$ and $S_r(\theta)$ are the respective responses of the left and right photodetectors to light at angle $\theta$ detected at the photodetectors, then the photocurrents measured by the left and rights photodetectors may calculated as:

$$i_L = \int_\theta \text{In}(\theta) \cdot S_L(\theta) \, d\theta$$

and $$i_r = \int_\theta \text{In}(\theta) \cdot S_r(\theta) \, d\theta.$$

However, the photocurrents calculated from both of these integrals may be equivalent to photocurrents generated from a "virtual" point light source at a centroid angle of the distribution. This centroid angle may be calculated from the measured photocurrents at the left and right photodetectors and used to calculate the equivalent centroid angle of the light source.

Each photodetector pair 111/112, 121/122, and 131/132 may have a total width L, the center of which may be aligned with a center of each respective aperture 102. In some embodiments, one or more of the centers of the photodetector pairs may be offset from the centers of their respective apertures and in some other instances the amount of offset may vary for different photodetector pairs 532-544 shown in FIG. 5D. For example, detector 536 is offset by an amount C, and detector 542 is offset by a different amount D. The optical detectors may be configured so that the outputs of corresponding photodetectors in each of the photodetector pairs are coupled together to increase light collection efficiency. For example, the photocurrent outputs of the left most photodetectors 111, 121, and 131 in each photodetector pair may be coupled together to generate an aggregate current $i_L$ proportional to a aggregated detected amount of light at the left most photodetectors 111, 121, and 131. Similarly, the photocurrent outputs of each of the right most photodetectors 112, 122, and 132 in each photodetector pair may be coupled together to generate an aggregate current $i_r$ of the right most photodetectors 112, 122, and 132.

The integrated circuit surface 105 may be metallic, such as a metal interconnecting layer used in silicon integrated circuit manufacturing. The edges of the apertures 102 may be beveled, as shown in FIG. 1A, and in some instances the beveled edges may be pointed away from the detectors, as also shown in FIG. 1A.

In this example, a pair of first and second photodetectors may be associated with each of the apertures. For example, first and second photodetectors 111 and 112 are associated with a left-most aperture A 102, so that the incident light passing through aperture A 102 is detected at one or both of the two apertures 111 and 112. Similarly, first and second photodetectors 121 and 122 may be associated with the center aperture B 102, so that the incident light passing through aperture B 102 is detected at one or both of those two apertures 121 and 122. Finally, first and second photodetectors 131 and 132 may be associated with the right-most aperture C 102, so that the incident light passing through aperture C 102 is detected at one or both of those two apertures 131 and 132. Each of the photodetectors 111 to 132 may be electrically isolated and separated from the others by a trench 103. Each of the photodetectors 111 to 132 and apertures A, B, and C, 120 may also be arranged in parallel to each other in the optical detector.

As the angle and direction of the incident light changes from the left side of the figure above the surface 105 to the right side above the surface 105 (or vise versa), the projection of the incident light through the apertures A, B, and, C 102 may also change from initially being entirely projected onto the right most detectors 112, 122, and 132 in each detector pair, to being projected less on the right most detectors 112, 122, and 132, and more on the left most detectors 111, 121, and 131 in each detector pair until the incident light is projected entirely on the left most detectors 111, 121, and 131.

The angle of the incident light may be calculated by comparing the photocurrents $i_L$ and $i_r$, which may be proportional to the detected light at the left and the right photodiodes respectively after the incident light passes through the aperture. The ability to calculate the angle of the incident light from a light source 101 may be dependent on the ability to detect light at both detectors in the pair as the angle calculation depends on the proportion of light reaching each detector in the pair.

Figure 2A:
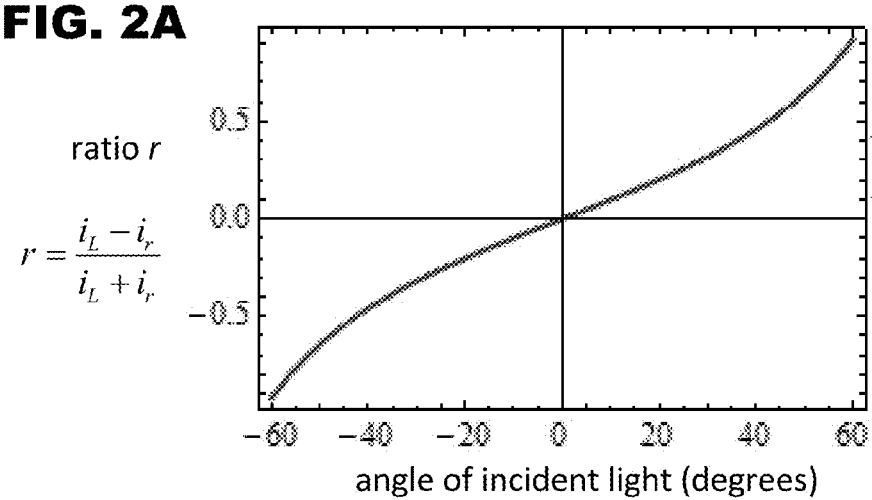
FIGS. 2A, 2B, and 2C show graphical examples of how relative photocurrents correlate to the incident light angle in different embodiments of the invention.
Figure 2B:
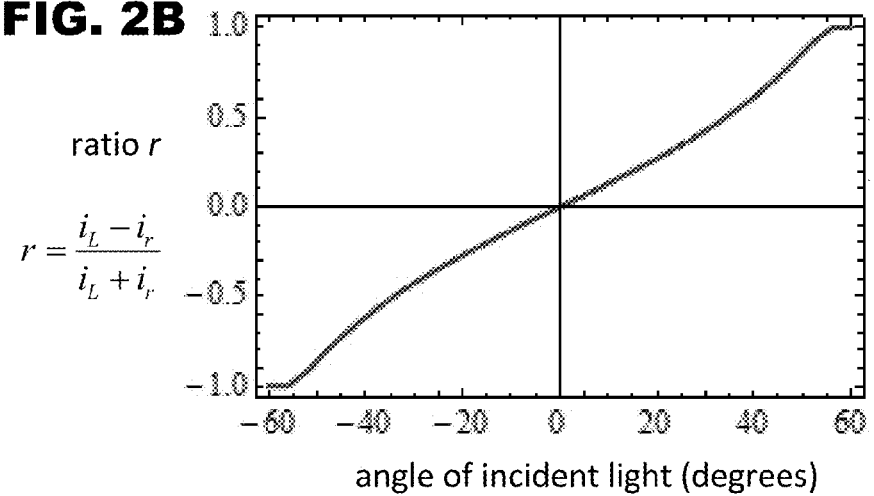
Figure 2C:
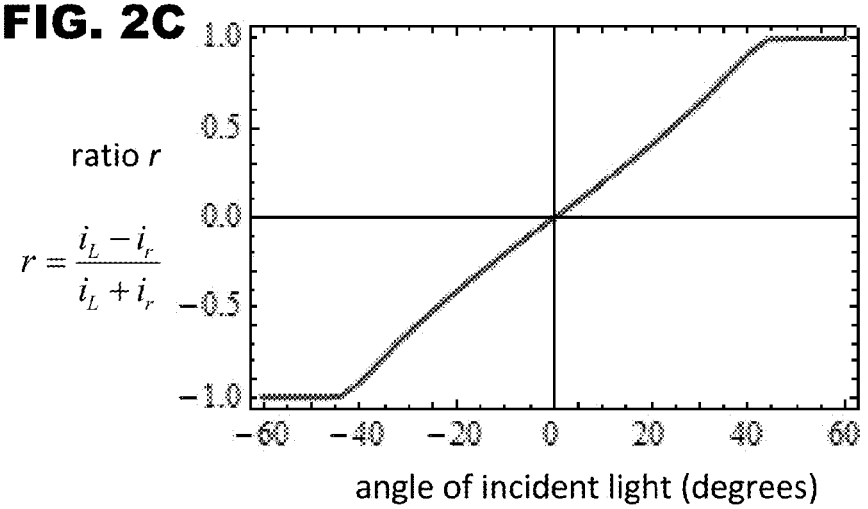

FIGS. 2A-2C show a graphical example of how a comparison of the relative photocurrents $i_L$ and $i_r$, from the detected light at the photodetectors correlates to the angle of the incident light for different parameters. The plots of the ratio r, calculated by dividing the difference of photocurrents $i_L$ and $i_r$, by the sum of photocurrents $i_L$ and $i_r$, versus the angle of the incident light shows how the angle of the incident light may be determined from the ratio r.

As shown in the plots, the transfer functions relating the angle of the incident light to the ratio r may be determined by the relative values of three parameters: height h between the photodetector and the aperture, width L of each photodetector pair, and the slit width s. In FIG. 2A, the slit width s is about 8 µm, while in FIGS. 2B and 2C the slit widths are 6 µm and 4 µm, respectively. The detector pair widths L and aperture heights h are constant at 18 µm and 2 µm, respectively, in each of FIGS. 2A-2C.

In different embodiments, these parameters may be varied depending on the application. For example, in some applications, the height h may be selected to be between 0 and 10 µm and the detector pair widths L may be selected to be greater than h and/or less than 5 h. In the case where the height h is 0, the integrated circuit surface having the aperture may be positioned directly on top of the photodetectors. The proportion of light detected at each of the photodetectors may still change as the angle of the incident light changes because the light reaching the detectors is absorbed over a certain depth within the photodetectors. This absorption depth within the photodetectors may be several microns deep. Thus, even though the integrated circuit surface having the aperture may be placed directly on top of the photodetectors, the light reaching the photodetectors may still travel an additional depth within the photodetector before the light is fully detected. The angle of the incident light may be calculated by comparing the photocurrents iL and ir, which may be proportional to the detected light at the left and the right photodiodes respectively after the incident light passes through the aperture.

The light collection efficiency may be increased by grouping many detector pairs together to aggregate the photocurrents measured at each detector pair. While increasing the number of detector pairs may increase the total measured photocurrents and the light collection efficiency, as the number of detector pairs increases in a fixed space, the width L of each detector pair may be reduced. Reducing the width L may narrow the range of angles of the light source measurable by each detector. Such a reduction may cause light arriving at less oblique angles to reach not only just one of detectors in each pair, but also an opposite detector of a next adjoining detector pair, leading to erroneous results.

This effect is shown in FIG. 1E, where incident light 171 from a light source may pass through aperture 102 striking the left-most photodetector 121 associated with the middle aperture B. However, a fraction of the incident light 171 may be reflected off the detector surface 121 and reach a bottom side of surface 105. Another fraction of the reflected light 172 reaching the bottom side of surface 105 may be reflected 172 off the bottom side and reach the right-most photodetector 112 associated with the left-most aperture 102. This reflected light 172 reaching the opposite photodetector (such as detector 112) in an adjacent photodetector pair may distort the final calculated proportion of light detected at each of the photodetectors, which is assumed to include only incident light 171. Thus, L needs to chosen depending on the operating angular range.

FIG. 1F shows an exemplary embodiment in which opaque barriers 181 may be positioned between photodetector pairs to prevent reflected light 172 from reaching detectors in adjacent detector pairs. As shown in FIG. 1F, incident light 171 that may be reflected 172 off the detector 121 may reach the opaque barrier 181. A fraction of the light reaching the opaque barrier may be reflected 172 off the barrier 181 and reach the detector 121, which may increase the amount of light measured at detector 121. The barrier 181 may therefore minimize the opportunity for reflected light 172 to reach adjacent detectors and thereby skew the proportion of light measured at each of the detectors, which in turn skews the calculated angle of the incident light.

Figure 1G:
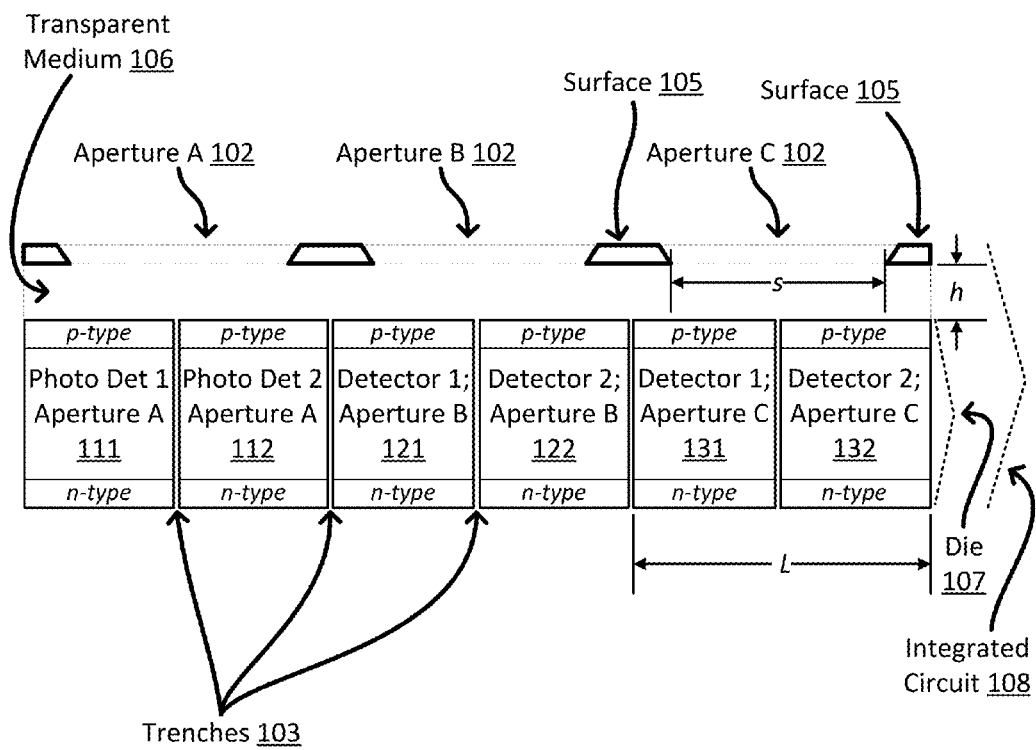

FIG. 1G shows another exemplary embodiment in which the width s of the apertures 102 is greater than the width of the surface 105 between the apertures 102. While this embodiment may be able measure a greater range of angles of the light source, as the ratio s/h is much larger than in the prior examples where the aperture width s was much smaller, the embodiment in FIG. 1G may be less sensitive to incremental light source angle changes. This lower sensitivity to smaller light source angle changes may occur because the larger aperture width may cause a smaller percentage of the incident light to shift between the detectors in each detector pair. Additionally, the larger aperture widths may result in increased noise, ambient light, and other sources of interference detected at the detectors.

Figure 3:
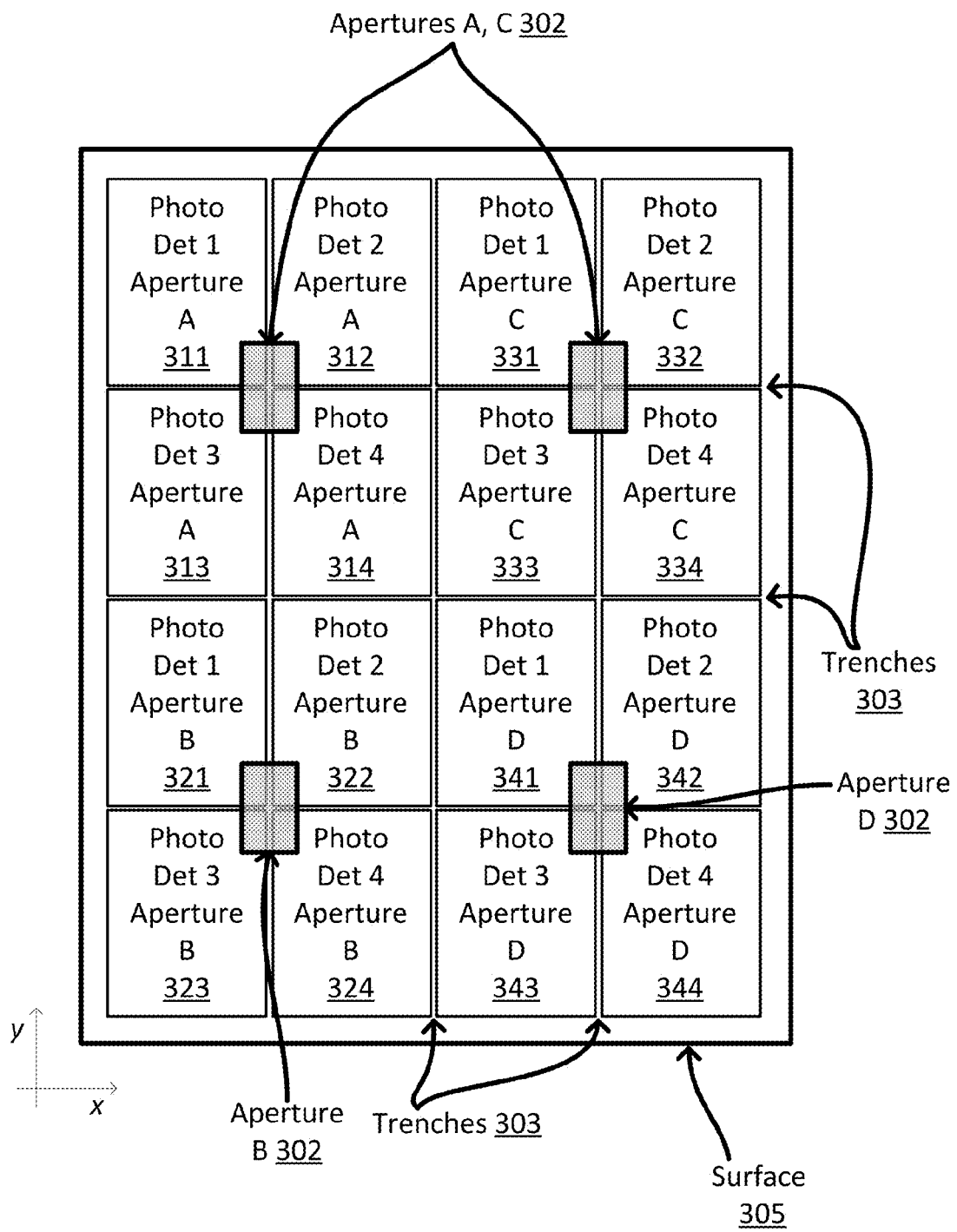
FIG. 3 shows an exemplary top-view perspective of a first two-dimensional optical detector in an embodiment of the invention.

FIG. 3 shows an exemplary top-view perspective of a first two-dimensional optical detector in an embodiment of the invention. This optical detector may be used to calculate an angle of incident light in a two-dimensional plane, such as the x-y plane shown in FIG. 3. In this example, each of the four rectangular apertures A, B, C, D 302 in surface 305 is associated with a group of four respective rectangular photodetectors 311-314, 321-324, 331-334, and 341-344, arranged side-by-side and separated by trenches 303 as shown. Additional photodetectors and apertures may also be used in different embodiments and the shape of the apertures and/or photodetectors may also vary in the different embodiments. For example, the apertures may be round or have a more complex shape. Similarly, the photodetectors may be shaped as sectors, polygons, or other shapes.

A center of each group of four side-by-side photodetectors may be aligned with a center of its respective associated aperture 302. For example, the center of side-by-side photodetectors 311-314 may be aligned with a center of aperture A 302, and so on. In other embodiments, the centers of the side-by-side photodetectors may offset from their respective aperture centers.

The angle of light in a first direction, such as the x direction may be determined by comparing the photocurrents from the left most photodetectors in each group (in this instance the first and third photodetectors 311, 313, 321, 323, 331, 333, 341, 343) to the right most photodetectors in each group (in this instance the second and fourth photodetectors 312, 314, 322, 324, 332, 334, 342, 344).

The angle of light in a second direction, such as the y direction may be similarly determined by comparing the photocurrents from the upper most photodetectors in each group (in this instance the first and second photodetectors 311, 312, 321, 322, 331, 332, 341, 342) to the lower most photodetectors in each group (in this instance the third and fourth photodetectors 313, 314, 323, 324, 333, 334, 343, 344).

Figure 4:
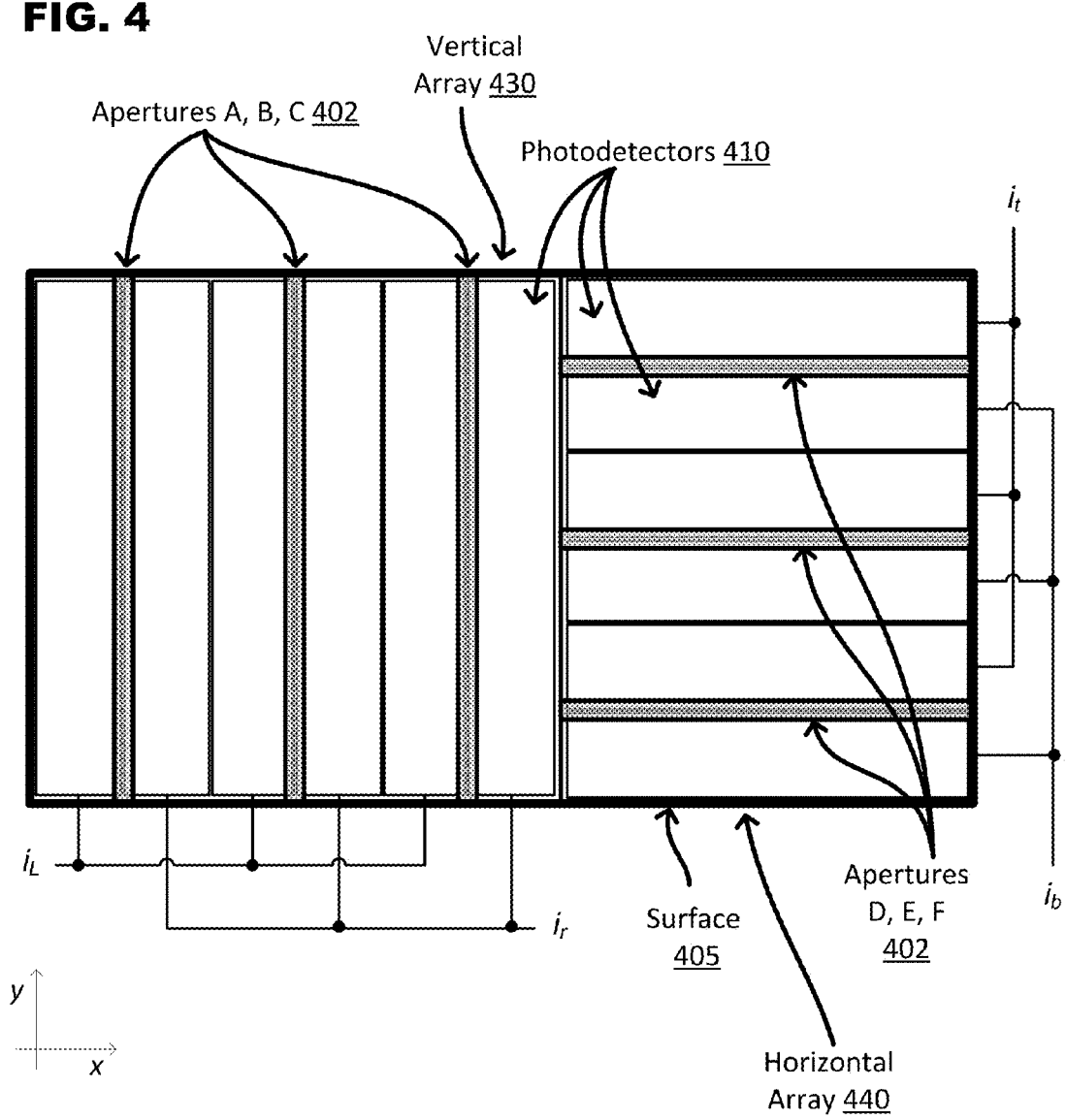
FIG. 4 shows an exemplary top-view perspective of a second two-dimensional optical detector in an embodiment of the invention.

FIG. 4 shows an exemplary top-view perspective of a second two-dimensional optical detector in an embodiment of the invention. In this example, arrays 430 and 440 of photodetectors 410 and slit apertures A-F 402 in a surface 405 may be arranged next to each other side-by-side. In some embodiments, each of the arrays 430 and 440 may be similar in structure to those shown in FIGS. 1 and 2, though in the other embodiments the shape, size, offset, and location of the photodetectors 410 and/or apertures 402 may vary from those shown.

The left most array 430 may have its photodetectors 410 and apertures A-C 402 arranged in a vertical (y direction) configuration 430 in order to measure an angle of the incident light in the x direction passing through apertures A-C 402. An aggregated photocurrent $i_L$ may be generated from each of the photodetectors 410 on the left of apertures A, B, and C 402 and an aggregated photocurrent $i_r$ may be generated from each of the photodetectors 410 on the right of apertures A, B, and C 402 based on the incident light reaching each of the respective photodetectors 410. The photocurrents may then be used to calculated the angle of the light in the horizontal x direction as discussed previously.

The right most array 440 may have its photodetectors 410 and apertures A-C 402 arranged in a horizontal (x direction) configuration 430 in order to measure an angle of the incident light in the y direction passing through apertures D-F 402. An aggregated photocurrent $i_t$ may be generated from each of the photodetectors 410 above apertures D, E, and F 402 and an aggregated photocurrent $i_b$ may be generated from each of the photodetectors 410 below apertures D, E, and F 402 based on the incident light reaching each of the respective photodetectors 410. The photocurrents may then be used to calculate the angle of the light in the vertical y direction as discussed previously. The photodetectors 410 in each of the arrays as well as the arrays themselves may be electrically isolated from each other.

FIG. 5 shows an exemplary top-view perspective of a third two-dimensional optical detector in an embodiment of the invention. In this example, detector arrays 501, 502, 503, and 504 may be combined side-by-side in the alternating vertical and horizontal array pattern shown (upper vertical array 501 to the left of upper horizontal array 502, which is above lower vertical array 503, which is to the right of lower horizontal array 504). Including more detector arrays and/or photodetectors in an array may improve the overall accuracy of the optical detector.

Figure 5A:
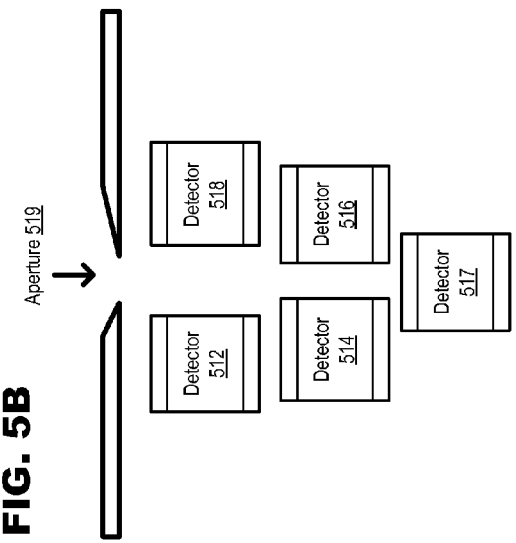
FIG. 5A shows an exemplary top-view perspective of a third two-dimensional optical detector in an embodiment of the invention.
Figure 5B:
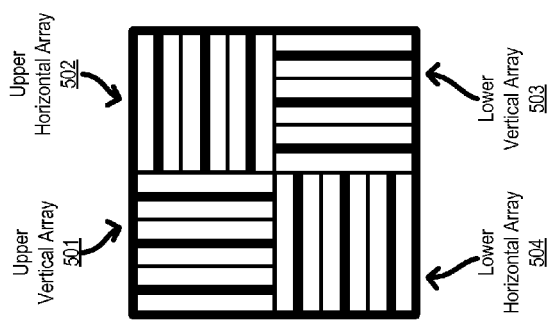
FIG. 5B shows an exemplary side-view perspective of a configuration of optical detectors in an embodiment of the invention.
Figure 5C:
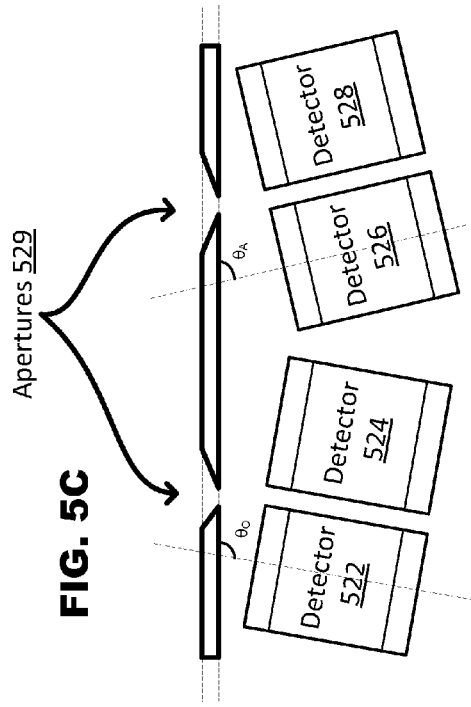
FIG. 5C shows an exemplary side-view perspective of another configuration of optical detectors in an embodiment of the invention.
Figure 5D:
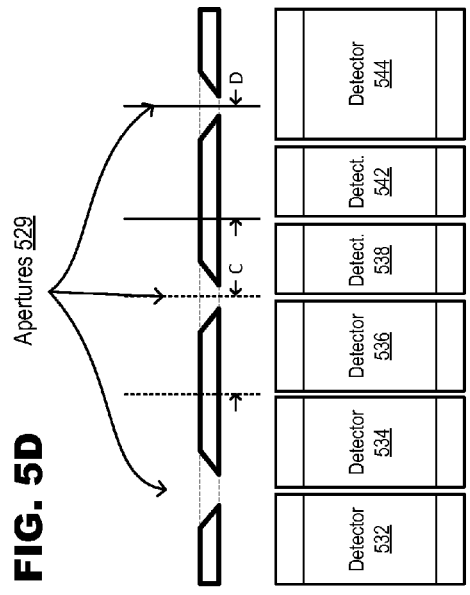
FIG. 5D shows an exemplary side-view perspective of yet another configuration of optical detectors in an embodiment of the invention.

In different embodiments, each of the arrays 501 to 504 may have similar or different photodetectors, apertures, or offsets. Some arrays may have photodetectors and/or apertures of different sizes, shapes, offsets and/or positions. For example, a multi-array detector may have some arrays similar to those shown in FIG. 3 and other arrays similar to that shown in FIG. 4. In some embodiments the apertures and their corresponding detectors may be arranged perpendicular to each other in the optical detector (as shown, for example, in FIGS. 4 and 5A), though they may also be arranged at other angles to each other, such as acute angles, e.g., $\theta_A$, or obtuse angles, e.g., $\theta_O$, as shown for detections 522-528 in FIG. 5C, or even on different planes as shown for detectors 512-518 in FIG. 5B. Some photodetectors may be arranged at different elevations in the detector as shown in FIG. 5B or even at different angles with respect to a surface of the detector as shown in FIG. 5C. For example, pairs of photodetectors such as shown in FIGS. 1, 3, 4, and 5 may be arranged in a 'V' configuration aligned with a center of the aperture as shown in FIG. 5B, instead of arranged in a parallel plane to the aperture and/or the surface.

Figure 6:
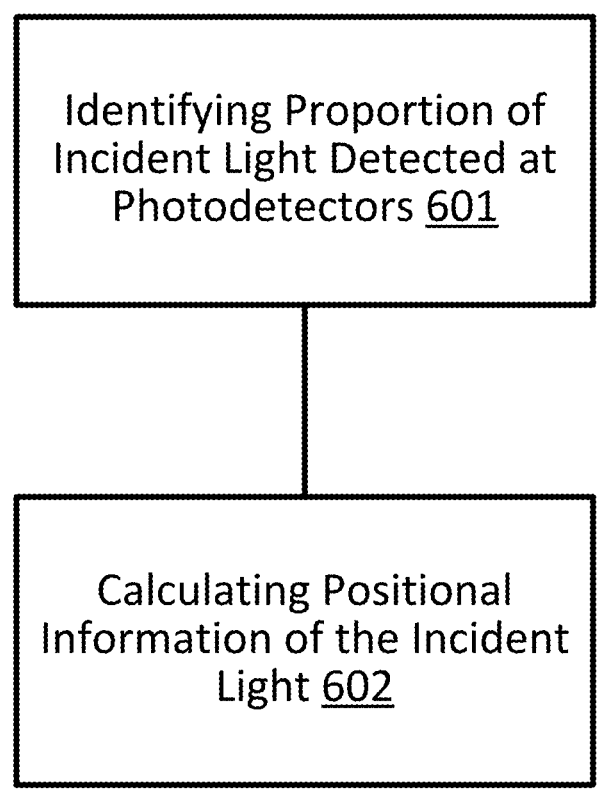
FIG. 6 shows an exemplary process in an embodiment of the invention.

FIG. 6 shows an exemplary process in an embodiment of the invention. In box 601, a proportion of incident light detected at a plurality of photodetectors after passing through an aperture may be identified. In box 602, positional information of the incident light may be calculated from the identified proportion of incident light detected at the plurality of photodetectors. The positional information may include information about angle of the light in one or more dimensions. A change in direction of the incident light may also be determined from changes to one or more angles of light.

In some instances, the proportion of incident light detected at the plurality of photodetectors may be identified without a use of a lens and/or the positional information of the incident light may be calculated without a use of a lens. The incident light may also pass through the aperture and reach the plurality of photodetectors without passing through a lens, though the incident light may passes through a medium between the aperture and the plurality of photodetectors before reaching the plurality of photodetectors. The medium may be a solid or liquid (such as a polymer or glass), or gas (such as air) that allows light to pass through the medium and need not alter a directional characteristic of light passing through it.

Figure 7:
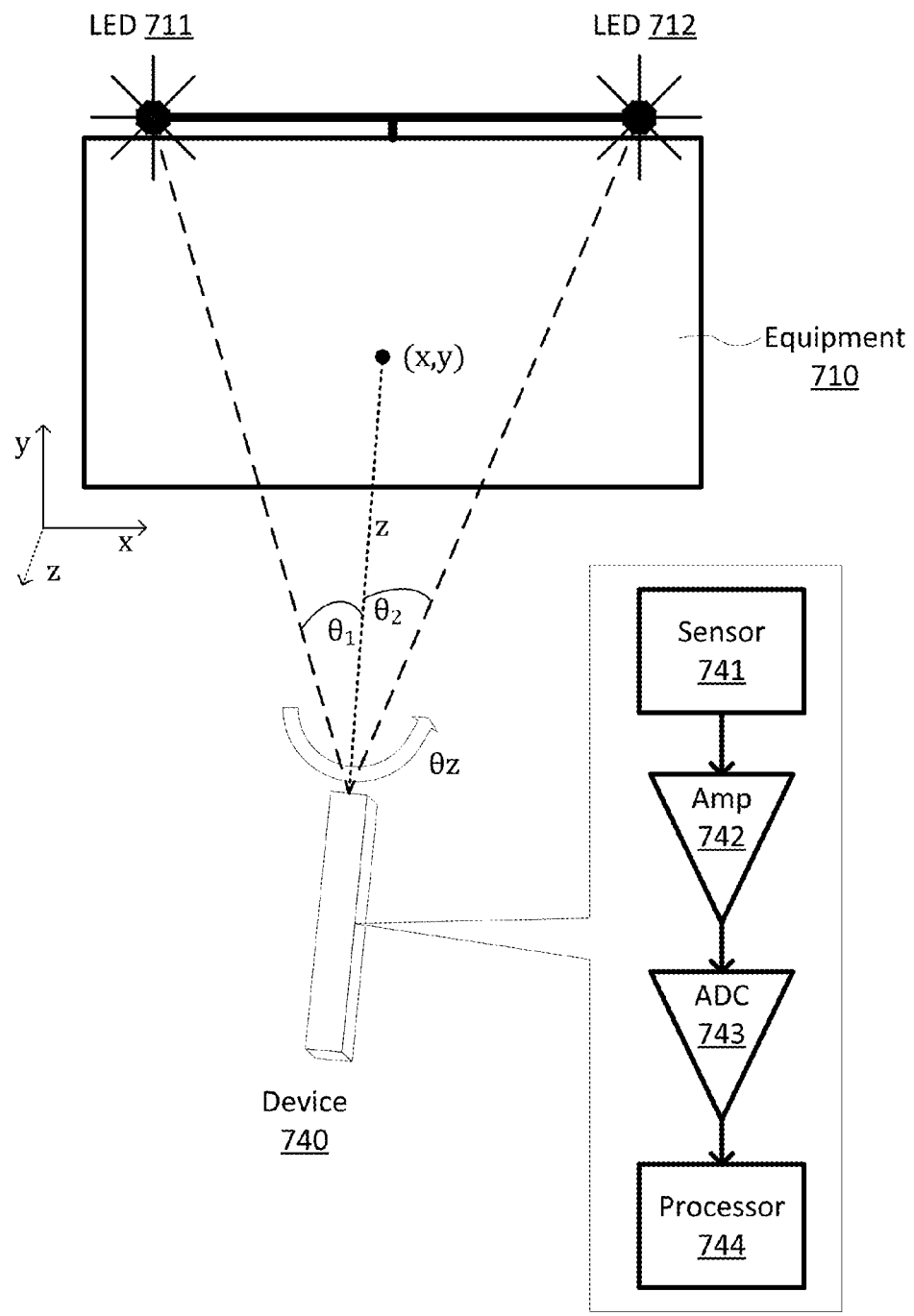
FIG. 7 shows an exemplary application in which a lens-less optical detector may be used to track movement of an object or device in multiple dimensions.

FIG. 7 shows an exemplary application in which a lens-less optical detector may be used to track movement of an object or device in multiple dimensions. In this example, one or more light sources, such as LEDs 711 and/or 712, may be positioned at known locations with respect to a piece of equipment 710, which may be a computer, tablet, television, or other equipment. Each of the light sources 711 and/or 712 may emit light that may be uniquely modulated in frequency, time, or phase, to identify a source of the emitted light. A lens-less optical detector may be included in a movable device 740. The optical detector may include a sensor 741 having photodetectors and/or photodetector arrays similar to those shown in the preceding figures. Photocurrents from the photodetectors in sensors 741 may be amplified through amplifier 742 before being converted into digital codes at the analog to digital converter 743.

A processor 744 may then be used to calculate an angle $\theta_1$ and/or $\theta_2$ of incident light from each of the light sources 711 and/or 712 in at least one dimension, depending on the sensor configuration. For example, if a one dimensional sensor configuration is used, then the angle of incident light from each light source with respect to the one dimension may be calculated. If a two dimensional sensor configuration is used, then angle of incident light from each light source may be calculated with respect to each of the two dimensions. The calculated angles of the incident light may then be used to determine a position of the sensors with respect to the light source as previously discussed.

Thus, if two light sources 711 and 712 are used with a one dimensional sensor, or one light source is used with a two dimensional sensor, then two dimensional position information, such as an x,y coordinate, of the detector with respect to the light source may be determined using geometry and/or triangulation. If three light sources are used with a one dimensional sensor or two light sources are used with a two dimensional sensor, then three dimensional position information, such as an x, y, z coordinate as well as an angle of rotation $\theta_z$ may be calculated using geometry and/or triangulation.

The example shown in FIG. 7 may be used in which the device 740 is a remote control and the light sources 711 and/or 712 are affixed to a television, computer, tablet, or other equipment 710. The sensor 741, amplifier 742, analog to digital converter 743, and/or processor 744 may be located in the remote control and may calculate a position, such as an (x,y) coordinate, at which the device 740 is being aimed. In the case of a television, for example, an (x,y) position on the screen that the remote control is being aimed at may be calculated from the calculated incident angle of light from each light source 711 and/or 712 detected at the sensors 741 in the remote control 740. Additionally, in some embodiments, a distance z of the remote control 740 from the light sources 711, 712 or the television screen may also be calculated. Finally, an angle of rotation of the sensors 741 with respect to the light sources 711 and 712 may also be calculated.

Although FIG. 7 shows the light sources 711, 712 mounted on the equipment 710 and the sensor 741 embedded in the device 740, in other embodiments the light sources 711, 712 may be included as part of the device 740, and one or more of the sensor 741, amplifier 742, converter 743, and processor 744 may be included as part of the equipment 710. In some instances, the device 740 and equipment 710 may be communicatively coupled so that position information may be transmitted between the device 740 and equipment 710. In addition in some embodiments the locations of the sensor 741, amplifier 742, converter 743, and processor 744 may be split between the equipment 710 and the device 740, so that, for example, the sensor 741 is included in the device 740, but the information obtained from the sensor 741 is transmitted to the equipment 710, where the processor 744 performs further data analysis and calculations.

Figure 8A:
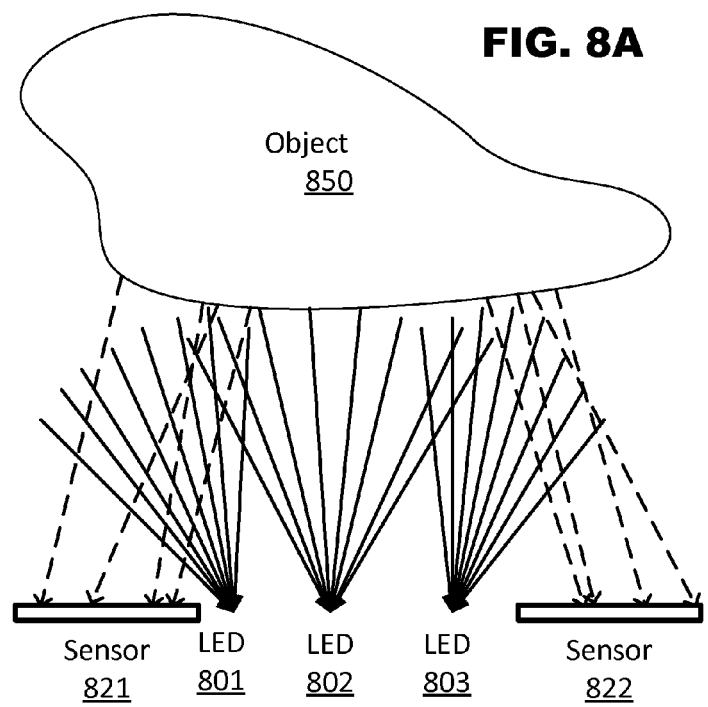
FIG. 8A shows another embodiment in which an object may be tracked based on emitted light that is reflected off the object.

FIG. 8A shows another embodiment in which an object may be tracked based on emitted light that is reflected off the object. In this example, one or more light sources, such as LEDs 801, 802, and 803, may be uniquely modulated into a region of space. When an object 850 enters the region of the space, the emitted light may be reflected off the object and strike the photodetectors in sensors 821 and 822. Each sensor 821 and 822 may include photodetectors and/or photodetector arrays similar to those shown in the preceding figures. Each sensor 821 and 822 may also be configured to identify the uniquely modulated light waves from one or more of the light sources 801 to 803. As discussed previously, the photocurrents from each of the photodetectors in sensors 821 and 822 may be used to determine an angle of the reflected light detected at the sensors 821 and 822. A position of the object 850 may then be calculated from the angles of the reflected light using geometry and/or triangulation.

Thus, embodiments of the invention may be used in cars as parking sensors or pedestrian detection devices to alert a driver of objects 850, such as pedestrians, trees, or other cars, that may be in the vicinity of the vehicle. Embodiments may also be used in electronic devices, such as smartphones, computers, and tablets to detect a presence or movement of an object, such as a finger. Embodiments may also be used to provide similar functionality to that of a trackball, touchpad, or mouse by tracking the movement of a finger or other object, such as a mouse. Embodiments may also be used to detect movement and provide robotic control over moving parts.

Lens-less sensors may also provide increased response times and sensitivity to changes in an intensity of detected light over traditional lens-based sensors. Lens-less sensors may also be capable of detecting light on much larger detector surfaces than lens-based sensors. These properties enable lens-less sensors to support data communications at high frequencies using modulated light in the hundreds of kilohertz to gigahertz range that may be transmitted through air.

Figure 8B:
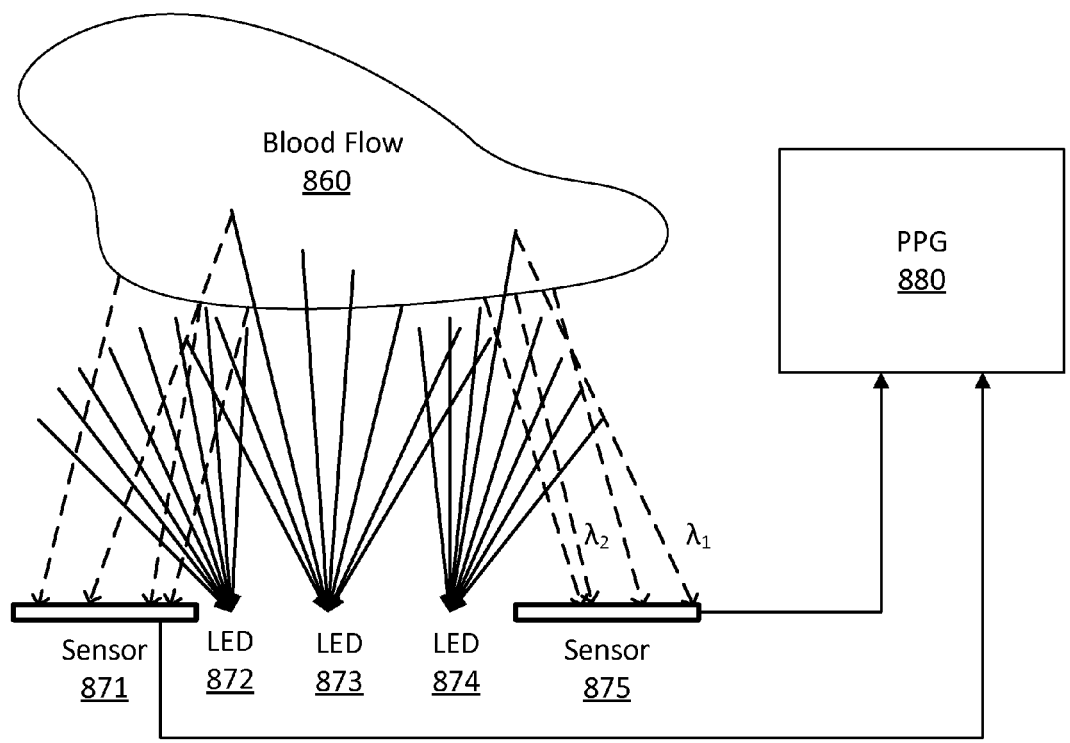
FIG. 8B shows another embodiment in which spectrometric information about an object may be measured based on emitted light passed through or reflected off the object.

In some embodiments, spectrometric information about an object can be measured in addition to the spatial information described previously. For example, blood oxygen levels may be measured using two colors of light (there are many choices but wavelengths near 660 nm and 940 nm are often selected) to perform a spectrometry on the blood inside the body. A heart rate, photoplethysmograph (PPG), and other oximetry measurements may be obtained from light detected at the lens-less sensor after passing through or being reflected off a blood flow in a person or animal. FIG. 8B shows an example embodiment in a PPG 880 for an object 860 can be measured. In this example, one or more light sources, such as LEDs 872, 873, and 874, may be uniquely modulated into a region of space. When an object, for example an object with blood flow 860, enters the region of the space, the emitted light may be reflected off or pass through the blood flow 860 and strike the photodetectors in sensors 871 and 875. Each sensor 871 and 875 may include photodetectors and/or photodetector arrays similar to those shown in the preceding figures. Each sensor 871 and 875 may also be configured to identify the uniquely modulated light waves from one or more of the light sources 872, 873, and 874. As discussed previously, the photocurrents from each of the photodetectors in sensors 871 and 875 may be used to determine an angle of the reflected light detected at the sensors 871 and 875. A PPG 880 of the object having blood flow 860 may then be calculated based on wavelengths $\lambda_1$, $\lambda_2$ of the received light.

PPG signals for pulse oximetry may be measured by calculating a DC signal level and an AC amplitude of the photocurrents from the detected light at each of the two wavelengths $\lambda_1$ and $\lambda_2$ after passing through or being reflected off a blood flow in a person or animal. The following ratio may be used to measure saturated blood oxygen:

$$R = \frac{(I_{AC}/I_{DC})_{\lambda_1}}{(I_{AC}/I_{DC})_{\lambda_2}}$$

The connection between R and the actual blood oxygen may be based on simple physical theory or an empirically measured fit between R and blood oxygen levels. This medical information may be provided in an embodiment in conjunction with object tracking and/or spatial positioning functionality.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments discuss the use of horizontally and vertically aligned aperture and/or photodetector arrays, but in other embodiments, some of the apertures and/or photodetectors may be aligned in other non-horizontal and non-vertical orientations.

I claim:

1. An integrated circuit for detecting an angle of incident light, comprising:
    a surface having apertures;
    a plurality of photodetectors arranged in at least three pairs of photodetectors and separated from each other by trenches, each of the pairs of the photodetectors is aligned underneath a respective one of the apertures; and
    an optically transparent solid medium disposed between the surface and the plurality of photodetectors,
    wherein at least two pairs of the pairs of photodetectors are aligned in a first direction and wherein outputs of corresponding photodetectors of each of the at least two pairs of photodetectors are electrically coupled together in parallel so as to generate aggregated photocurrents that depend on the angle of the incident light in relation to the first direction, with the angle of incident light in relation to the first direction being detectable based on a ratio of the aggregated photocurrents generated by the corresponding photodetectors of the at least two pairs of photodetectors; and
    a plurality of opaque barriers disposed in the optically transparent solid medium, wherein each of the at least three pairs of photodetectors is separated from each adjacent pair of photodetectors by one of the plurality of opaque barriers and the pairs of photodetectors that are adjacent to each another are collinear.

2. The integrated circuit of claim 1, wherein the trenches that separate the photodetectors within each pair of the photodetectors are aligned with respective centers of the apertures.

3. The integrated circuit of claim 1, wherein each aperture is a slit.

4. The integrated circuit of claim 1, wherein the apertures have edges and each edge of the apertures is beveled.

5. The integrated circuit of claim 4, wherein the beveled edges are directed away from the photodetectors.

6. The integrated circuit of claim 1, wherein the apertures are sections of the surface that are permeable to light.

7. The integrated circuit of claim 1, wherein the surface is disposed less than 30 microns above the pairs of photodetectors.

8. The integrated circuit of claim 1, wherein the optically transparent solid medium comprises a polymer or a glass.

9. The integrated circuit of claim 1, wherein each of the plurality of opaque barriers is configured to prevent reflected light from reaching photodetectors in an adjacent pair of photodetectors, wherein photodetectors within each pair of photodetectors are optically connected.

10. The integrated circuit of claim 1, further comprising at least two additional pairs of photodetectors aligned in a second direction substantially perpendicular to the first direction.

11. The integrated circuit of claim 10, wherein outputs of corresponding photodetectors of the at least two additional pairs of photodetectors are electrically coupled together in parallel so as to generate an aggregated photocurrent depending on the angle of the incident light in relation to the second direction, with the angle of incident light in relation to the second direction being detectable based on a ratio of the aggregated photocurrents generated by the corresponding photodetectors of the at least two additional pairs of photodetectors.

12. A method for detecting an angle of light incident on an integrated circuit that includes a plurality of electrically isolated photodetectors arranged in at least three pairs, with at least two pairs of the at least three pairs of photodetectors being aligned in a first direction and outputs of corresponding photodetectors of each of the at least two pairs of photodetectors being electrically coupled together in parallel so as to generate aggregated photocurrents, each of the at least three pairs of photodetectors is separated from each adjacent pair of photodetectors by different ones of a plurality of opaque barriers, and the pairs of photodetectors that are adjacent to each another are collinear, the method comprising:
    receiving the incident light at the at least two pairs of photodetectors through respective apertures along an optical path without passing through a lens;
    combining currents generated by corresponding photodetectors of each of the at least two pairs of photodetectors to produce aggregated photocurrents that depend on the angle of the incident light in relation to the first direction; and
    determining the angle of incident light in relation to the first direction based on a ratio of the aggregated photocurrents generated by the corresponding photodetectors of the at least two pairs of photodetectors.

13. The method of claim 12, wherein the integrated circuit comprises at least two additional pairs of photodetectors aligned in a second direction substantially perpendicular to the first direction and wherein outputs of corresponding photodetectors of the at least two additional pairs of photodetectors are electrically coupled together in parallel so as to generate aggregated photocurrents depending on the angle of the incident light relative to the second direction, the method further comprising:
    receiving the incident light at the at least two additional pairs of photodetectors through respective apertures along an optical path without passing through a lens;
    combining currents generated by corresponding photodetectors of each of the at least two additional pairs of photodetectors to produce aggregated photocurrents that depend on the angle of the incident light relative to the second direction; and
    determining the angle of incident light relative to the second direction based on a ratio of the aggregated photocurrents generated by the corresponding photodetectors of the at least two additional pairs of photodetectors.

14. The method of claim 12, further comprising:
    blocking, with an opaque barrier disposed in an optically transparent solid medium between adjacent pairs of photodetectors, light reflected from a first pair of photodetectors from reaching an adjacent second pair of photodetectors, and light reflected from the second pair of photodetectors from reaching the first pair of photodetectors.

15. The method of claim 12, wherein the apertures are sections of a surface of the integrated circuit that are permeable to light.

16. The method of claim 12, wherein the apertures are formed as slits.

17. The method of claim 15, wherein the surface is disposed less than 30 microns above the pairs of photodetectors.

18. A lens-less apparatus for detecting an angle of incident light, comprising:
- means for electrically isolating photodetectors from each other, the photodetectors being arranged in at least three pairs of photodetectors,
- means for optically isolating each of the at least three pairs of photodetectors from adjacent pairs of photodetectors, wherein pairs of photodetectors that are adjacent to each another are collinear;
- means for generating aggregated photocurrents from the photodetectors of at least two pairs of photodetectors aligned in a first direction in response to the incident light; and
- means for permitting the incident light to reach the means for generating along an optical path without a lens, said optical path extending through an optically transparent solid medium, wherein the angle of incident light in relation to the first direction is detectable based on a ratio of the aggregated photocurrents from the at least two pairs of photodetectors.

19. The apparatus of claim 18, wherein the means for permitting comprise an aperture.

20. The apparatus of claim 19, wherein the aperture is a section of a surface that is permeable to light.

21. The apparatus of claim 19, wherein the aperture is formed as a slit extending perpendicular to the first direction.

22. The apparatus of claim 18, further comprising:
- second means for generating aggregated photocurrents from the photodetectors of at least two additional pairs of photodetectors aligned in a second direction in response to the incident light; and
- means for permitting the incident light to reach the second means for generating along a second optical path without a lens, said second optical path extending through the optically transparent solid medium, wherein the angle of incident light in relation to the second direction is detectable based on a ratio of the aggregated photocurrents from the at least two additional pairs of photodetectors.

23. The apparatus of claim 20, wherein the means for optically isolating comprises an opaque barrier disposed between the at least two pairs of photodetectors in an optically transparent solid medium arranged between the surface and the photodetectors and configured to prevent reflected light from reaching photodetectors in an adjacent pair of photodetectors.

* * * * *